United States Patent [19]

Ennis

[11] Patent Number: 4,935,982
[45] Date of Patent: Jun. 26, 1990

[54] ROTARY BRUSH VEHICLE WASHING SYSTEM

[75] Inventor: G. Thomas Ennis, Playa del Rey, Calif.

[73] Assignee: N/S Corporation, Inglewood, Calif.

[21] Appl. No.: 296,578

[22] Filed: Jan. 12, 1988

[51] Int. Cl.⁵ .............................................. B60S 3/06
[52] U.S. Cl. ............................. 15/53 AB; 15/DIG. 2
[58] Field of Search ................ 15/53 A, 53 AB, 97 B, 15/DIG. 2

[56] References Cited

U.S. PATENT DOCUMENTS

| | | | |
|---|---|---|---|
| 3,428,983 | 2/1969 | Seakan | 15/21 |
| 3,434,172 | 3/1969 | Wilson | 15/21 |
| 3,471,883 | 10/1969 | Ennis | 15/21 |
| 3,626,537 | 12/1971 | Wilson | 15/21 |
| 3,720,972 | 3/1973 | Ennis | 15/21 |
| 3,812,549 | 5/1974 | Hanna | 15/21 |
| 3,840,931 | 10/1974 | Bivens | 15/21 |
| 3,881,208 | 5/1975 | Miner | 15/21 |
| 3,926,663 | 12/1975 | Gray | 134/6 |
| 4,059,862 | 11/1977 | Ashton | 15/53 |
| 4,198,722 | 4/1980 | Ennis | 15/53 |
| 4,225,995 | 10/1980 | Ennis | 15/53 |
| 4,270,958 | 6/1981 | Ennis | 134/6 |
| 4,299,003 | 11/1981 | Ennis | 15/53 |
| 4,332,625 | 6/1982 | Ennis | 134/6 |
| 4,354,291 | 10/1982 | Ennis | 15/53 |

FOREIGN PATENT DOCUMENTS

| | | | |
|---|---|---|---|
| 1580082 | 5/1970 | Fed. Rep. of Germany | |
| 0144155 | 9/1982 | Japan | 15/53 AB |

Primary Examiner—Edward L. Roberts
Attorney, Agent, or Firm—Cahill, Sutton & Thomas

[57] ABSTRACT

A vehicle washing system includes either one or two substantially vertically oriented vehicle cleaning brushes for washing the front, sides and rear of the vehicle. A supporting frame extends over and across the vehicle travelling along a path. The frame is divided by the path centerline into a first frame section extending across a first path section lying on the first side of the path centerline and a second frame section extending across the second path section lying on the second side of the path centerline. First and second brush support arms are each coupled to a different frame section and pivotally support rotating vehicle cleaning brushes. The shaft of the first brush is positioned within the first path section when its brush support arm is deflected into an open position and is positioned within the second path section when its brush support arm is deflected into a closed position. The shaft of the second brush is positioned within the second path section when its brush support is deflected into an open position and into the first path section when deflected into a closed position.

24 Claims, 3 Drawing Sheets

RIGHT START

*FIG. 4A*

LEFT START

*FIG. 4B*

RIGHT FINISH

*FIG. 5A*

LEFT FINISH

RIGHT BRUSH START

Fig. 8A

LEFT BRUSH START

Fig. 8B

RIGHT BRUSH FINISH

Fig. 9A

LEFT BRUSH FINISH

Fig. 9B

ROTARY BRUSH VEHICLE WASHING SYSTEM

BACKGROUND OF THE INVENTION

1. Field of the Invention

This invention relates to vehicle washing systems, and more particularly, to rotary brush vehicle washing systems.

2. Description of the Prior Art

The following U.S. Patents were issued to Mr. G. Thomas Ennis for a rotary brush vehicle washing system: 4,354,291, issued 10/19/82; 4,332,625, issued 6/1/88; 4,299,003, issued 11/10/81; 4,270,958, issued 6/2/81; 4,225,995, issued 10/7/80; 4,198,722, issued 4/22/80. This prior art system utilizes a short brush support arm and a long brush support arm which are pivotally mounted in lontigudinal alignment along the path on opposite sides of the vehicle path. Because each brush support arm is pivotally coupled to an elevated support frame at precisely the same elevation, the maximum inboard deflection of each brush support arm is limited to a position well outside the path centerline. This inboard deflection limitation is necessary to prevent interference between the two rotating brushes and then equal height brush support arms. These restrictions on the maximum inboard deflection of these two spaced apart brushes prevent either brush from cleaning any vehicle surface located on the opposite side of the path centerline. This prior art vehicle washing system is therefore capable of cleaning the front and rear vehicle surfaces only one time, occasionally creating a cleaning gap at the midpoint of the vehicle front and rear surfaces.

SUMMARY OF THE INVENTION

It is therefore a primary object of the present invention to provide a rotary brush vehicle washing system having one or more brushes each of which is capable of cleaning substantially the entire front, one entire side and substantially the entire rear of a vehicle.

Another object of the present invention is to provide a rotary brush vehicle washing system having a pair of rotating brushes each capable of cleaning the entire front, one side and the entire rear surfaces of a vehicle to provide double washing action across the front and rear vehicle surfaces.

Another object of the present invention is to provide a rotary brush vehicle washing system where lateral deflection of the brushes with respect to the vehicle is provided by the relative direction of rotation of the brushes with respect to the vehicle surface.

Another object of the present invention is to provide a rotary brush vehicle washing system which can be configured either as a drive through or as a rollover system.

Briefly stated, an in accord with one embodiment of the invention, a vehicle washing system washes a vehicle moving forward relative to the system where the vehicle is generally centered about a defined vehicle travel path having a centerline as the vehicle is washed by the system. This system includes a supporting frame elevated above the vehicle which extends across the path and is divided by the path centerline into a first frame section extending across a first path section lying on a first side of the path centerline and a second frame section extending across a second path section lying on a second side of the path centerline. A brush support arm includes first and second ends where the first end is pivotally mounted to the first frame section at a fixed lateral location within the first path section for enabling the brush support arm to be laterally deflected back and forth between a closed position and an open position. A rotatable brush for washing the vehicle includes a brush support shaft with upper and lower ends. A brush suspension system is coupled to the second end of the brush support arm and to the upper end of the brush support shaft for enabling the brush to be rotated and for positioning the brush shaft within the first path section when the brush support arm is deflected into the open position. The brush suspension system also enables the brush shaft to be positioned within the second path section when the brush support arm is deflected into the closed position. Biasing means biases the brush support arm into the closed position and enables the brush support arm to be laterally deflected into the open position in response to contact between the brush and the vehicle. A brush drive system engages the brush support shaft and rotates the brush in a direction which causes the brush support arm to be deflected out of the closed position and into the open position in response to brush to vehicle engagement.

DESCRIPTION OF THE DRAWINGS

The invention is pointed out with particularity in the appended claims. However, other objects and advantages together with the operation of the invention may be better understood by reference to the following detailed description taken in connection with following illustrations, wherein:

DESCRIPTION OF THE PREFERRED EMBODIMENT

In order to better illustrate the advantages of the invention and its contributions to the art, two different preferred hardware embodiments of the invention will now be described in some detail.

Figure 1A:
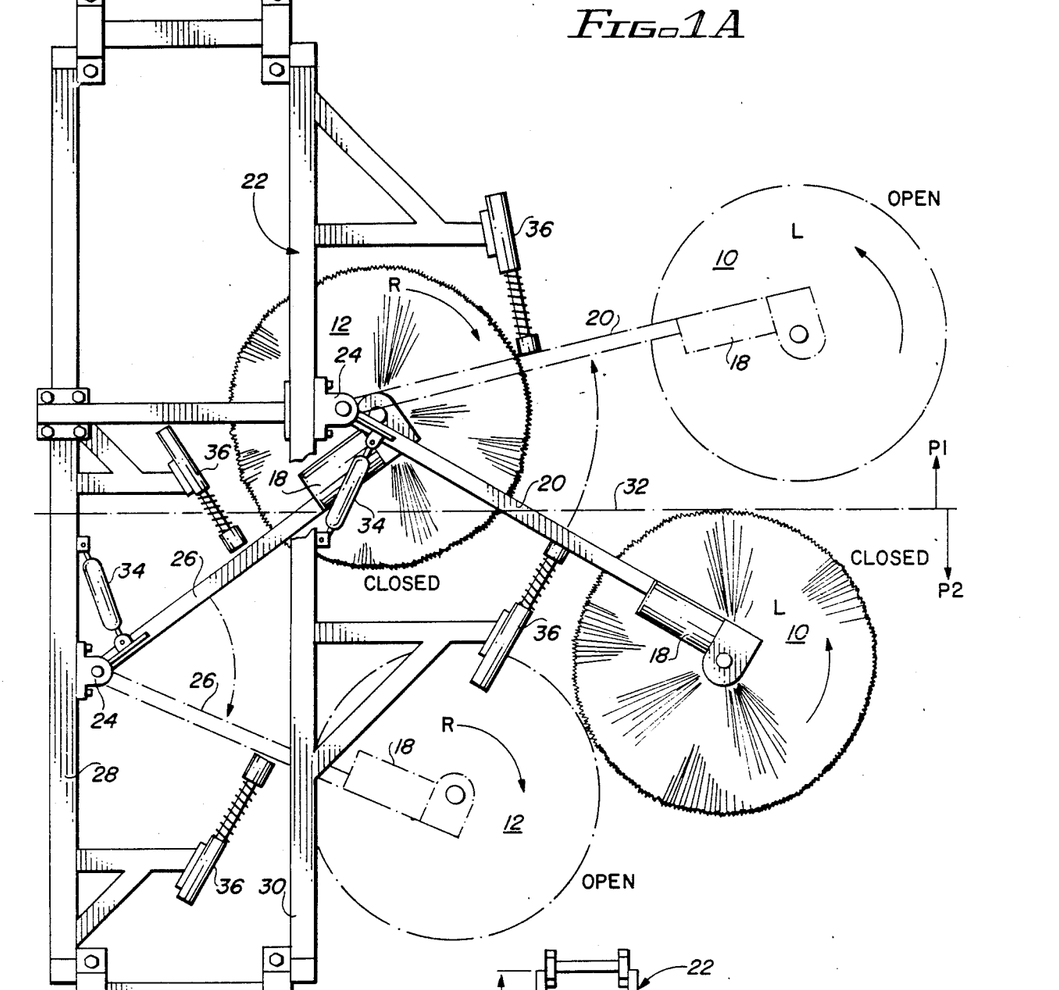
FIG. 1A represents a plan view from above of the rotary brush vehicle washing system of the present invention showing the right and left brushes in the closed position. In dotted line depictions, the right and left brushes are shown in the open position.

Referring now to FIGS. 1A, 1B, 2 and 3, a rotary brush vehicle washing system includes a left or first brush 10 and a right second brush 12. Each brush includes a centrally aligned support shaft 14 attached to a coupling 16 which is further illustrated in FIG. 1C. In the preferred embodiment of the invention, coupling 16 not only serves to attach the brush support shaft 14 to a motor/gear box assembly 18, but also enables brushes 10 and 12 to be deflected in the vertical axis as a result of engagement with the vehicle. A suitable embodiment of the brush coupling/motor-gear box assembly is disclosed in U.S. Pat. No. 4,299,003 issued on Nov. 10, 1981 to G. Thomas Ennis. The complete disclosure of that patent is hereby incorporated by reference. In the preferred embodiment of the invention, an elongated, cylindrical flexible coupling 16 fabricated from polyruethane and other materials is used to achieve optimum performance. Coupling 16 is commercially available from the N/S Corporation of Inglewood, Calif. and is designated as the N/S Superflex Coupling Part No. 765-2720. This flexible coupling as well as the flexible coupling disclosed in the '003 patent are fabricated using a resilient elastomeric material which enables the coupling to tilt or deflect in any direction as the vehicle washing brushes are rotated by motor/gear box assembly 18. Due to the resilient nature of flexible coupling 16, any deflection of that coupling from the vertical axis will cause the coupling to generate a restoring force seeking to return brush support shaft 14 back to the vertical axis or equilibrium position.

Although a flexible coupling 16 of the type described above having the capability of generating a restoring force is highly desirable and yields optimum results, other types of deflectable couplings such as a mechanical universal joint either with or without outboard mounted spring biasing devices for providing a restoring force will function acceptably in connection with the present invention.

In the broadest scope of the invention, the output of motor/gear box 18 may be directly and rigidly coupled to the upper end of brush support shaft 14. In this embodiment of the invention where the deflectable coupling 16 is omitted, the relative vehicle travel through the vehicle washing system must be more carefully controlled to prevent damage to the brushes, to the brush support shafts 14 or to the motor/gear box assembly 18.

When a deflectable or tiltable coupling 16 is utilized, abrupt engagement between the vehicle and the brush assemblies results in a deflection of the brush support shaft 14 from the vertical axis away from the force of impact and prevents damage to the various moving elements of the vehicle washing system. The optimum performance of the vehicle washing system of the present invention is achieved when a flexible coupling system providing a restoring force of the type disclosed in the N/S '003 patent is utilized.

The left or first brush 10 is pivotally coupled by a first brush support arm 20 to an overhead supporting frame generally identified by reference number 22. The pivotal coupling between brush support arm 20 and supporting frame 22 is typically provided by a fixed mounted mechanical pivot assembly 24 which typically includes a rectangular mounting plate bolted to the frame and a bearing assembly having upper and lower bearings of a design well known to those of ordinary skill in the art. An appropriate pivot assembly is depicted in the N/S '003 patent.

A second or right brush 12 is supported by and pivotally mounted to frame 22 by a second brush support arm 26. The first or inboard end of brush support arm 26 is also coupled by a pivot assembly 24 to supporting frame 22.

Brush support arms 20 and 26 are typically fabricated as single piece, non-articulating struts and maintain a fixed distance between pivot assemblies 24 and motor/gear box assemblies 18. In an alternative embodiment, a pivotal coupling could be placed either near the midpoint of one or both brush support arms or toward the motor/gearbox 18 to provide for greater lateral deflection of the brushes.

In the embodiment of the invention depicted in FIGS. 1A, 1B, 2 and 3, brush support arms 20 and 26 are mounted at staggered locations along the vehicle travel path. Brush support arm 26 is coupled to and supported by a first frame element 28 while brush support arm 20 is coupled to and supported by a second frame element 30.

In an alternative embodiment of the invention, frame 22 could be configured as two completely independent frame sections: a first frame section for supporting one brush support arm and a second frame section for supporting the second frame section. Such different types of frame configurations would be obvious to one skilled in the art.

The lateral centerline of the vehicle travel path is represented in the drawing figures by a line designated by reference number 32. The arrow designated "vehicle travel" in FIGS. 1B and 2 illustrates the general direction of vehicle travel through the rotary brush vehicle washing system of the present invention when it is configured as a drive through vehicle washing system.

Since the vehicle washing system of the present invention operates based upon relative movement between the vehicle and the vehicle washing system, the present invention can also be configured to operate in an identical manner as a rollover vehicle washing system which rolls over a stationary or parked vehicle. In the rollover embodiment of the present invention, the vehicle can be completely washed by a single front to rear pass of the rollover vehicle washing system relative to a stationary vehicle. Since the vehicle washing system of the present invention will more frequently be fabricated as a stationary drive through vehicle washing system, the balance of the description of the preferred embodiment of the invention will be limited to this stationary configuration.

Supporting frame 22 is elevated above the vehicle and extends across the path travelled by the vehicle as it drives through the vehicle washing system. In FIG. 1B, the width of the path is designated by the reference letter "P" which represents a typical path width for a generalized vehicle types. For narrower vehicles, the path dimension will be reduced and for wider vehicles, the path width will be increased. Due to the unusual performance and structural characteristics of the present invention, the path need not be exactly centered relative to frame 22. With minor changes in the brush support arm structure and the pivot assembly mounting point, the vehicle washing system of the present invention can be designed to accommodate a wide variety of path widths or relative lateral path locations with respect to the centerline of frame 22. The path dimension and configuration illustrated in FIG. 1B is therefore merely representative of one particular type of structure for implementing the present invention.

Figure 1B:
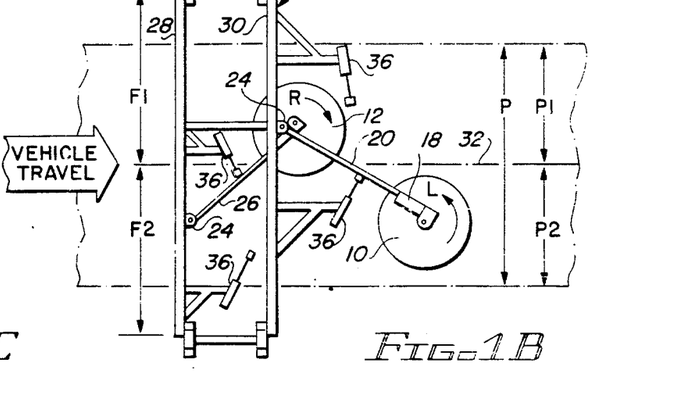
FIG. 1B represents a simplified plan view of the vehicle washing system illustrated in FIG. 1A showing the right and left brushes in the closed position.
Figure 1C:
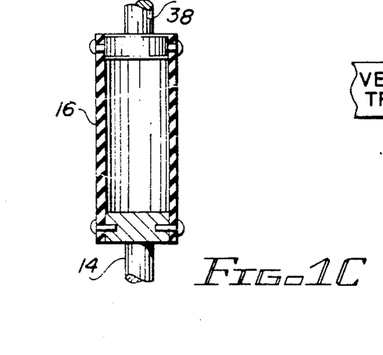
FIG. 1C represents a sectional view of the deflectable coupling or flexible coupling used in the rotary brush vehicle washing system of the present invention.
Figure 2:
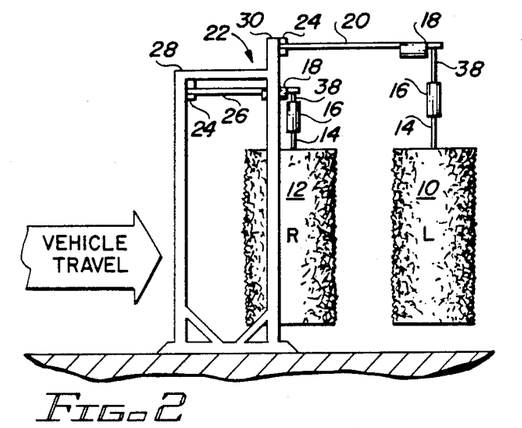
FIG. 2 represents a simplified elevational view from the right side of the vehicle washing system of the present invention, particularly illustrating the embodiment of the invention in which the brush support arms are pivotally coupled to the supporting frame at staggered locations along the vehicle path.

Once a path has been defined as illustrated in FIG. 1B, the path for purposes of discussion can be divided into a first path section "P1" and a second path section "P2" which lie on opposite sides of the path centerline 32. Path centerline 32 also divides supporting frame 22 into first and second frame sections "F1" and "F2" as illustrated in FIG. 1B. It is neither required nor necessary that frame sections F1 and F2 be equal in size or centered relative to support frame 22.

In order to provide for the designated function of the vehicle washing system of the present invention, brush support arm 20 is pivotally mounted to second frame element 30 at a lateral location within first path section P1. This particular lateral location of the inboard or first end of first brush support arm 20 when combined with an appropriately selected brush support length as illustrated in the drawing figures enables the brush support shaft 14 of left brush 10 to lie within the second path section P2 when the brush plus brush support arm assembly is maintained in the "closed" position depicted in FIG. 1B. Similar considerations regarding the length of brush support arm 26 and the lateral location of pivot assembly 24 for that brush support arm within second frame section F2 enable right brush 12 to be positioned into the first path section P1 when brush support arm 26 is deflected into the "closed" position illustrated in FIG. 1B.

Brush support arms 20 and 26 are each biased into the closed position by an appropriate type of biasing device. In the preferred embodiment of the invention, the vertical axis of pivot assembly 24 is tilted or deflected so that the top of pivot assembly 24 is closer to the path centerline 32 than the bottom of the pivot assembly. A wide variety of other biasing device for accomplishing the same purpose would be readily apparent to one of ordinary skill in the art. The tilted pivot assembly biasing system of the present invention essentially provides for a gravity biasing force which maintains brush support arms 20 and 26 in the closed position as depicted in FIG. 1B.

As illustrated in FIG. 1A, the preferred embodiment of the invention includes a damper 34 in the form of a shock absorber to damp back and forth lateral movement of the brush support arms relative to the vehicle. One end of each damper is coupled to the support frame 22 while the opposite end is coupled to near the first end of the brush support arm. Although damper 34 enhances the operation of the vehicle washing system of the present invention, it is not necessary or essential to the operation of the invention.

A second type of damper or shock absorber 36 is provided to limit or terminate the lateral deflections or swinging actions of brush support arms 20 and 26. In the preferred embodiment illustrated in FIG. 1A, each damper assembly 36 is configured somewhat like a spring-actuated pogo stock. Upon initial contact with a swinging brush support arm, the foot of damper assembly 36 is telescopically displaced toward the body of damper 36, causing a spring to be compressed thereby generating a restoring force. A pair of dampers 36 is provided for each brush support arm to define the maximum deflection limits of the inboard and outboard swinging motion of the brush support arm.

As illustrated in FIG. 1A and FIG. 2, a brush suspension system consisting of motor/gear box assembly 18 and a short drive shaft 38 is coupled to the second end of brush support arms 20 and 26 to engage coupling 16 and the upper end of brush support shaft 14. Each of the two brush suspension systems used in the vehicle washing system of the present invention enables the brush to be rotated and maintains or positions the brush support shaft 14 within the appropriate path section when each brush support arm is deflected into the closed position. Each brush suspension system therefore operates to maintain left brush 10 in path section P2 when the left brush is maintained in the "closed" position while the other brush suspension system maintains right brush 12 in path section P1 when that brush is maintained in the "closed" position as illustrated in FIG. 1B.

In the preferred embodiment of the invention illustrated in the drawings, brush support arms 20 and 26 are illustrated as fixed length, rigid struts which maintain a fixed distance between the motor/gearbox 18 and pivot assembly 24. It is not necessary that the brush support arms be configured to extend in a direct line between pivot assembly 24 and motor/gear box assembly 18. A pivot assembly or hinge may be inserted in either one or both of the brush support arms to provide for enhanced lateral deflections of the brushes as they move between the closed and open positions.

The direction of brush rotation relative to the vehicle surface is critical to the proper function of the present invention. In the various drawing figures, arrows designating the direction of rotation of brushes 10 and 12 have been utilized to designate the appropriate and proper direction of brush rotation. This specific type of opposing brush rotation direction for each brush assembly causes the brushes to engage and "walk" along the surface of the vehicle being washed in the appropriate direction in a manner explained in detail in the N/S '003.

It is important to the proper functioning of the present invention that the relative lengths of brush support arms 20 and 26 be chosen such that brushes 10 and 12 do not interfere with each other as the brushes are deflected between the open and closed positions. Although some overlap between brushes 10 and 12 will not create any operational difficulty and may in many instances be desirable, more than a limited amount of such overlap may create operational problems. In the FIG. 1A staggered frame configuration of the invention, the relative spacing between frame elements 28 and 30 as well as the length of brush support arms 20 and 26 must be selected to minimize or eliminate brush to brush interference.

Figure 3:
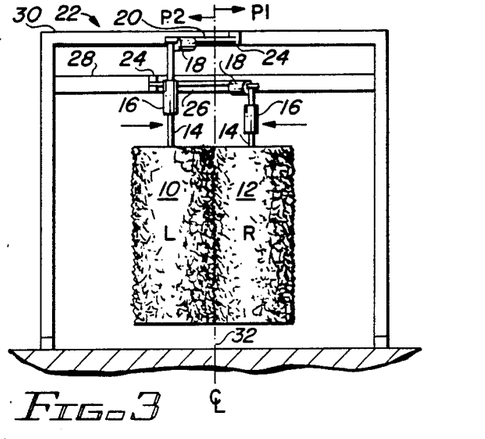
FIG. 3 represents an elevational view of the vehicle washing system illustrated in FIG. 2 taken from the exit end of the vehicle washing system.

As illustrated in FIGS. 2 and 3, brush support arms 20 and 26 are maintained vertically spaced apart to prevent mechanical interference between the two brush support arms which either partially or completely overlap each other.

Figure 6:
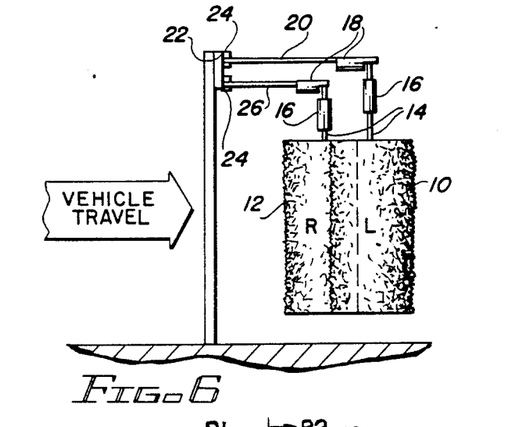
FIG. 6 represents a simplified elevational view from the right side of the vehicle washing system of the present invention particularly depicting an embodiment having brush support arms longitudinally aligned along the vehicle path.
Figure 7:
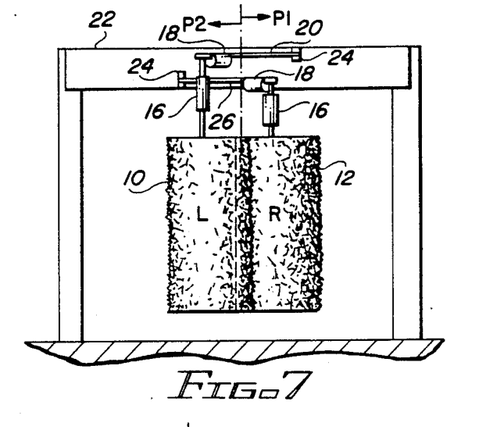
FIG. 7 represents an elevational view taken from the exit end of the vehicle washing system shown in FIG. 6.

In a second embodiment of the invention depicted in FIGS. 6–9B, the brush support arms are secured to support frame 22 in longitudinal alignment along the vehicle path. FIGS. 6 and 7 illustrate the manner in which the length of brush support arms 20 and 26 as well as the vertical separation between these brush support arms are configured to avoid mechanical interference between the two brush systems of the present invention as they are deflected between the open and closed position as the vehicle is cleaned.

Referring now to FIGS. 4A, 4B, 5A and 5B, the operation of the staggered frame embodiment of the present invention will now be described in detail.

Figure 4A:
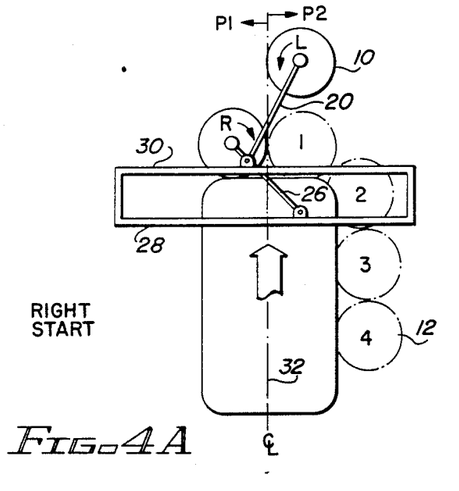
FIG. 4A represents a simplified plan view from above of the staggered brush support arm configuration of the invention shown in FIG. 1A, particularly illustrating the initial engagement between the front of a vehicle and the right vehicle washing system brush.

FIG. 4A depicts the point of first contact between the left front surface of the vehicle and right vehicle cleaning brush 12. Due to the relative rotation between brush 12 and the front surface of the vehicle, brush 12 will begin to walk across the front of the vehicle from the left front corner of the vehicle toward the right front corner of the vehicle. The length of brush support arm 26, the brush diameter, the relative location of damper 36 and other structural considerations are selected such that brush 12 will contact a typical widest vehicle at the leftmost extremity of the front surface of the vehicle. As the vehicle continues to drive through the vehicle washing system of the present invention, brush 12 will travel completely across the front surface of the vehicle as a result of the rotational direction of that brush creating the walking force described above.

Figure 4B:
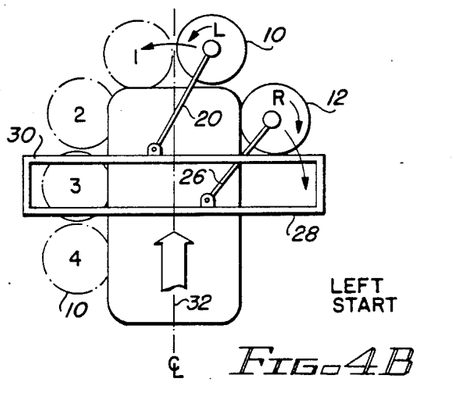
FIG. 4B illustrates the configuration of the right and left brushes of the vehicle washing system illustrated in FIG. 1A after the vehicle has moved further into the vehicle washing system and has engaged the left brush.

FIG. 4B illustrates a further forward advancement of the vehicle relative to the vehicle washing system. At this point, brush 12 has walked completely across the front surface of the vehicle and has commenced cleaning the right side surface of the vehicle. Left brush 10 has been similarly designed and configured to contact the extreme right front surface of the widest anticipated vehicle and has commenced its leftward travel across the entire front surface of the vehicle. Left brush 10 therefore washes the difficult to clean vehicle front surface a second time travelling in a direction opposite that taken by the right brush and rotating in the opposite direction to provide for enhanced vehicle cleaning action. As illustrated by the sequentially numbered circles, left brush 10 then continues its cleaning sweep down the left hand side of the vehicle as the vehicle continues to advance through the vehicle washing system.

Figure 5A:
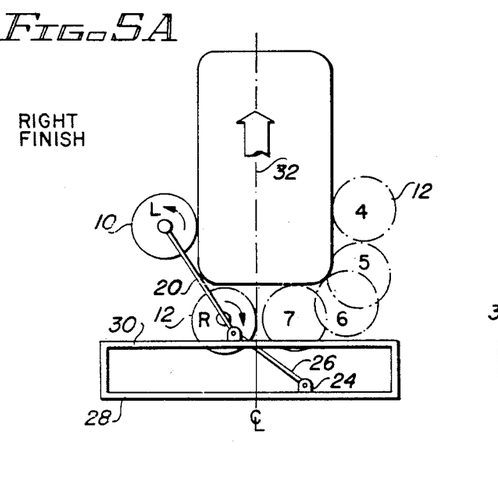
FIG. 5A illustrates the vehicle washing system illustrated in FIG. 4A showing the vehicle advanced to a point where the right brush travels from the near or right rear edge to the far or left rear edge of the vehicle.

FIG. 5A illustrates the vehicle as it continues to drive through the vehicle washing system, depicting the right brush continuing to advance down the right hand side of the vehicle until it reaches a point where it can swing from the open position into the closed position to complete a first cleaning path across the entire rear vehicle surface. Note that the left brush 10 continues to clean the left side of the vehicle even after the right brush has completed its washing path across the rear surface of the vehicle.

Figure 5B:
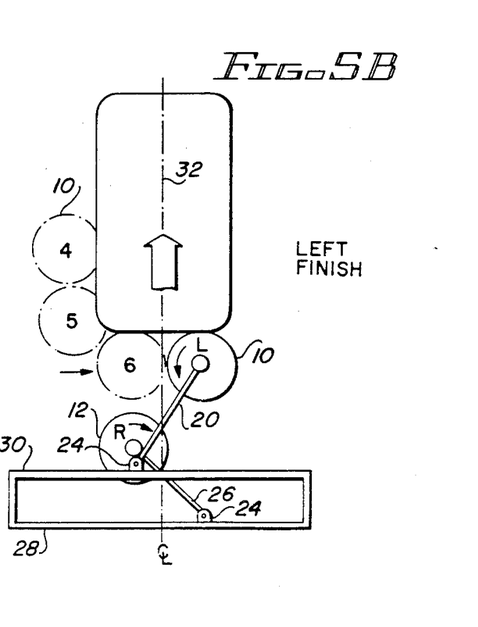
FIG. 5B illustrates the vehicle washing system shown in FIG. 4A where the vehicle has advanced through the vehicle washing system to a point where the left brush travels from the near or left edge to the far or right rear edge of the vehicle.

FIG. 5B illustrates the vehicle as it continues to drive forward showing the manner in which left brush 10 continues to clean the left vehicle surface and then makes a complete second pass from the left hand side to the right hand side across the vehicle rear surface. This independent, sequential deflection of brush 10 across the entire rear surface of the vehicle completes a second cleaning pass over this difficult to clean vehicle surface.

The unique configuration of the present invention therefore permits two completely independent, full length cleaning passes across both the front and rear surfaces of the vehicle and essentially doubles the front and rear surface vehicle cleaning action in comparison to the cleaning action provided for by the prior art vehicle washing system disclosed in the N/S '003 patent.

Figure 8A:
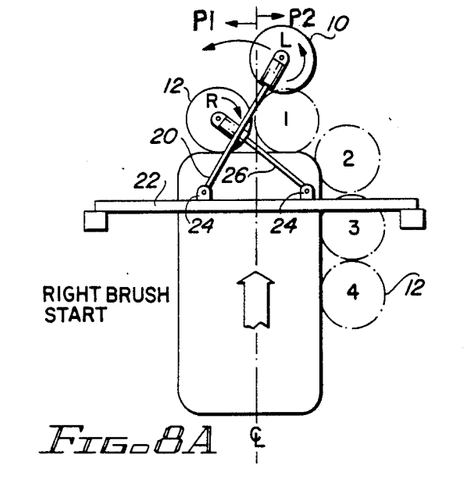
FIG. 8A represents a simplified plan view from above of the vehicle washing system depicted in FIGS. 6 and 7, particularly illustrating a vehicle having reached a point where the front of the vehicle initially engages the right brush of the vehicle washing system.
Figure 8B:
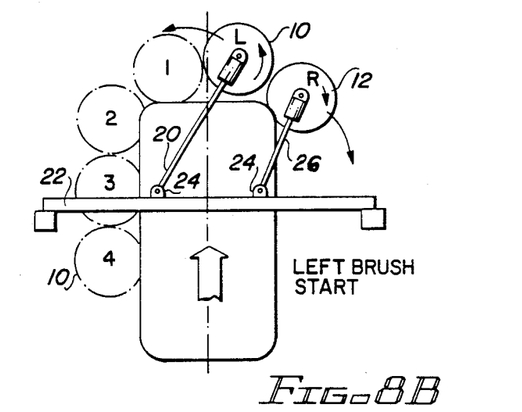
FIG. 8B illustrates the vehicle washing system shown in FIG. 8A depicting the point at which the vehicle has advanced to a location where the front of the vehicle initially engages the left vehicle washing brush.

Referring now to FIGS. 8A, 8B, 9A and 9B, the operation of the longitudinally aligned frame configuration of the invention will now be described. FIG. 8A illustrates the point of initial contact between the vehicle and right brush 12 to commence a complete cleaning pass of the right brush across the entire front surface of the vehicle. FIG. 8B corresponds to the relative vehicle to vehicle washing system location described in connection with FIG. 4B and illustrates the manner in which the left brush 10 completes a second complete cleaning cycle across the front of the vehicle.

The length of the brush supports arms, the brush diameter and the relative lateral location of pivot assemblies 24 must be selected such that each brush shaft remains in one path section when the brush is placed in the closed position and is deflected into the opposite path section when the brush is moved from the open position into the closed position.

FIGS. 8A and 8B illustrates that right brush 12 is positioned in the second path section P2 before brush to vehicle engagement and is then deflected into the first path section P1 as brush 12 is deflected from the closed position illustrated in FIG. 8A into the open position illustrated in FIG. 8B.

Figure 9A:
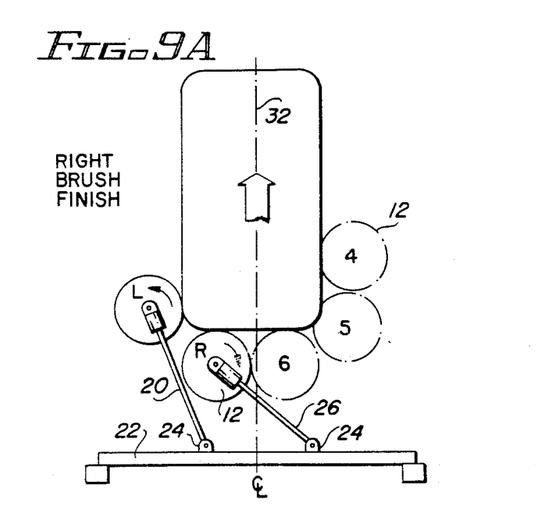
FIG. 9A illustrates the vehicle washing system shown in FIG. 8A depicting the vehicle at a point where the right brush sweeps from one edge to the opposite edge across the rear of the vehicle.
Figure 9B:
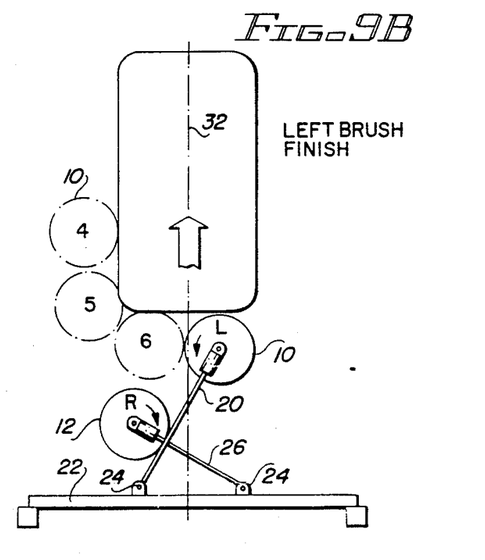
FIG. 9B illustrates the vehicle washing system shown in FIG. 8A depicting the vehicle at a point of advancement where the left brush sweeps from one edge to the opposite edge across the rear of the vehicle to wash the rear surface of the vehicle a second time.

FIGS. 9A and 9B depict the manner in which brushes 10 and 12 travel to clean the vehicle rear surface two times in a manner similar to that described in FIGS. 5A and 5B.

In order to achieve proper cleaning action on the rear surfaces of the vehicles, all embodiments of the invention are designed and configured such that pivot assemblies 24 are laterally positioned at a location inside the vehicle path as shown in all of the drawing figures. If pivot assemblies 24 are placed outside the vehicle path, optimum cleaning action across the rear surface of the vehicle will not be achieved. If complete cleaning action across the entire rear surface of the vehicle is not deemed essential, then pivot assemblies 24 may be displaced to a location outboard of the path.

Numerous prior art vehicle washing systems utilize paired, counter-rotating vehicle washing brushes one of which washes the left half of the front and rear ends of the vehicle and the other of which washes the right half of the front and rear ends of the vehicle. On vehicles having vertically oriented bumper guards, grilles or other vertically oriented surfaces located on the front and rear vehicle ends, one of the sides of these vertical surfaces is often not cleaned well by such prior art systems.

This vertical surface cleaning problem is completely solved by the present invention. With the present invention, first brush 10 rotating in a first direction (counterclockwise) passes completely across the front and rear ends of the vehicle and thoroughly and completely washes one side of all vertically oriented surfaces such as bumper guards. Second brush 12 rotating in a second direction (clockwise) then travels completely across the front vehicle surface and subsequently the rear vehicle surface. Because second brush 12 passes across the front and rear vehicle surfaces in a second, opposite direction with a second opposite direction of rotation relative to that of first brush 10, the opposite side of all vertically oriented surfaces is thoroughly cleaned by brush 12.

The ability of the present invention to accomplish two full width passes across both the front and rear vehicle surfaces from opposing directions utilizing brushes having opposing directions of rotation enables the present invention to completely contact and wash both the left and right sides of all front end and rear end vertically oriented surfaces and accomplishes substantially improved cleaning performance.

The configuration of the present invention has been described above as either a drive through vehicle washing system or as a rollover system. Alternatively, a conveyor system could be provided for the drive through vehicle washing system configuration to convey a vehicle through the vehicle washing system at a constant rate of speed.

It will be apparent to those skilled in the art that the disclosed rotary brush vehicle washing system may be modified in numerous ways and may assume many embodiments other than the preferred forms specifically set out and described above. For example, a wide variety of different support frame configurations could be utilized in combination with a variety of brush support arm configurations to duplicate the function of the present invention which utilizes a cleaning brush rotating in a vertical axis with a specified rotational direction to travel completely cross and wash the front and rear surfaces of a vehicle two times in opposite directions and with opposing brush rotation directions. The unique structure of the present invention also provides for a dual brush vehicle washing system where vertical clearance is provided between two oppositely moving vehicle cleaning brush assemblies to provide for non-interfering cleaning action which is directly responsible for the double cleaning action on the front and rear surfaces of a vehicle. Accordingly, it is intended by the appended claims to cover all such modifications of the invention which fall within the true spirit and scope of the invention as recited in the following claims.

I claim:

1. A vehicle washing system for washing a vehicle moving forward relative to the system where the vehicle is generally centered about a defined vehicle travel path having a centerline as the vehicle is washed by the system, comprising:
   a. a supporting frame elevated above the vehicle, extending across the path and being divided by the path centerline into a first frame section extending across a first path section lying on a first side of the path centerline and a second frame section extending across a second path section lying on a second side of the path centerline;
   b. a non-articulating brush support arm having first and second ends, the first end being pivotally mounted to the first frame section at a fixed lateral location within the first path section for enabling the brush support arm to be laterally deflected back and forth between a closed position and an open position;
   c. a rotatable brush for washing the vehicle having a support shaft with upper and lower ends;
   d. a brush suspension system coupled to the second end of the brush support arm and to the upper end of the brush support shaft for enabling the brush to be rotated and for positioning the brush shaft within the first path section when the brush support arm is deflected into the open position and for positioning the brush shaft within the second path section when the brush support arm is deflected into the closed position, the distance between the first end of the brush support arm and the upper end of the brush support shaft remaining fixed as the brush support arm is deflected between the open and closed positions;
   e. means for biasing the brush support arm into the closed position and for enabling the brush support arm to be laterally deflected into the open position in response to contact between the brush and the vehicle; and
   f. a brush drive system for engaging the brush support shaft and for rotating the brush in a direction which causes the brush support arm to be deflected out of the closed position and into the open position in response to brush to vehicle contact.

2. The vehicle washing system of claim 1 wherein said vehicle includes front and rear ends and first and second sides.

3. The vehicle washing system of claim 2 wherein the brush engages, moves laterally across and washes substantially the entire front end of the vehicle as the brush support arm is laterally deflected from the closed position into the open position.

4. The vehicle washing system of claim 3 wherein the brush support arm is deflected from the open position into the closed position as the rear end of the vehicle clears the brush while the rotating brush moves laterally across and washes substantially the entire rear end of the vehicle.

5. The vehicle washing system of claim 2 wherein the brush suspension system includes a deflectable coupling for enabling the lower end of the brush shaft to be displaced relative to the upper end of the brush shaft, causing a tilting deflection of the brush shaft in response to engagement between the vehicle and the brush support shaft.

6. The vehicle washing system of claim 5 wherein the deflectable coupling includes a flexible coupling.

7. The vehicle washing system of claim 6 wherein the flexible coupling is fabricated from a resilient material which generates a restoring force in response to any deflection of the flexible coupling from an equilibrium position.

8. The vehicle washing system of claim 7 wherein the flexible coupling is fabricated from an elastomeric material.

9. A vehicle washing system for washing a vehicle moving forward relative to the system where the vehicle is generally centered about a defined vehicle travel path having a centerline as the vehicle is washed by the system, comprising:

a. a supporting frame elevated above the vehicle, extending across the path and being divided by the path centerline into a first frame section extending across a first path section lying on a first side of the path centerline and a second frame section extending across a second path section lying on a second side of the path centerline;

b. a first brush support arm having first and second ends, the first end being pivotally mounted to the first frame section at a fixed lateral location within the first path section for enabling the brush support arm to be laterally deflected back and forth between a closed position and an open position;

c. a second brush support arm having first and second ends, the first end being pivotally mounted to the second frame section at a fixed lateral position within the second path section for enabling the brush support arm to be laterally deflected back and forth between a closed position and an open position;

d. a first rotatable brush for washing the vehicle having a support shaft with upper and lower ends;

e. a second rotatable brush for washing the vehicle having a support shaft with upper and lower ends;

f. a first brush suspension system coupled to the second end of the first brush support arm and to the upper end of the first brush support shaft for enabling the first brush to be rotated and for positioning the first brush shaft within the second path section when the first brush support arm is deflected into the closed position;

g. a second brush suspension system coupled to the second end of the second brush support arm and to the upper end of the second brush support shaft for enabling the second brush to be rotated and for positioning the second brush shaft within the first path section when the second brush support arm is deflected into the closed position;

h. means for biasing the first and second brush support arms into the closed position and for enabling the first and second brush support arms to be laterally deflected into the open position in response to contact between each brush support arm and the vehicle;

i. a first brush drive system for engaging the first brush support shaft to rotate the first brush in a direction which causes the first brush support arm to be deflected out of the closed position and into the open position in response to brush to vehicle engagement; and j. a second brush drive system for engaging the second brush support shaft to rotate the second brush in a direction which causes the second brush support arm to be deflected out of the closed position and into the open position in response to brush to vehicle engagement.

10. The vehicle washing system of claim 9 further including a. a first pivot assembly for pivotally coupling the first brush support arm to the first frame section; and b. a second pivot assembly for pivotally coupling the second brush support arm to the second frame section.

11. The vehicle washing system of claim 10 wherein:

a. the first brush support arm includes a non-articulating arm for maintaining a fixed distance between the upper end of the brush support shaft and the first pivot assembly; and b. the second brush support arm includes a non-articulating arm for maintaining a fixed distance between the upper end of the brush support shaft and the second pivot assembly.

12. The vehicle washing system of claim 11 wherein the first and second brush support arms are vertically spaced apart to provide vertical clearance between the brush support arms to thereby enable the first and second brush support arms to be independently laterally deflected between the open and closed positions in response to sequential engagement between the vehicle and the first and second brushes.

13. The vehicle washing system of claim 12 wherein the length of the first brush support arm exceeds the length of the second brush support arm to prevent interfering contact between the first and second rotating brushes as the first and second brush support arms are sequentially deflected between the open and closed positions in response to vehicle to brush engagement.

14. The vehicle washing system of claim 13 wherein the first and second brush suspension systems each include a deflectable coupling for enabling the lower end of the brush shaft to be displaced relative to the upper end of the brush shaft resulting in a tilting deflection of the brush shaft in response to engagement between the vehicle and the brush support shaft.

15. The vehicle washing system of claim 14 wherein the deflectable coupling includes a flexible coupling.

16. The vehicle washing system of claim 15 wherein the flexible coupling is fabricated from a resilient material which generates a restoring force in response to a deflection of the flexible coupling from an equilibrium position.

17. The vehicle washing system of claims 12 or 13 wherein the first and second brush support arms are coupled to the supporting frame at staggered locations along the path.

18. The vehicle washing system of claims 12 or 13 wherein the first and second brush support arms are pivotally coupled to the supporting frame at laterally aligned locations along the path.

19. The vehicle washing system of claim 18 wherein the first and second brush support arms are each fabricated from a single rigid strut.

20. The vehicle washing system of claim 18 wherein the first and second brush support arms are coupled to the supporting frame such that the vehicle initially contacts the brush supported by the shorter brush support arm and subsequently contacts the brush supported by the longer brush support.

21. The vehicle washing system of claim 18 wherein the vehicle includes front and rear ends and first and second sides and wherein both the front end and the rear ends of the vehicle are washed twice by sequential engagement of the front and rear ends of the vehicle with brushes supported by both the first and second brush support arms.

22. The vehicle washing system of claim 21 wherein the first and second brush support arms and the first and second brush suspension systems are configured to initially contact a far front side of the vehicle and then to subsequently sweep across the entire front surface of the vehicle as each brush support arm is deflected from the closed position into the open position due to relative movement between the vehicle and the brush and the brush rotation direction.

23. The vehicle washing system of claim 9 wherein the vehicle includes front and rear end surfaces and first and second side surfaces and wherein:
 a. the first brush engages and travels across the vehicle front end surface while moving in a first lateral direction and while rotating in a first direction; and
 b. the second brush travels across the front end surface while moving in a second lateral direction and while rotating in a second direction.

24. The vehicle washing system of claim 23 wherein:
 a. the first brush travels across the vehicle rear end surface while moving in a second lateral direction and while rotating in a first direction; and
 b. the second brush travels across the vehicle end surface while moving in a first lateral direction and while rotating in a second direction.

* * * * *